Feb. 9, 1932.　　　J. F. ROSENTHAL　　　1,844,440
TRACTOR WHEEL
Filed June 17, 1931　　　3 Sheets-Sheet 1

Inventor
John F. Rosenthal

By Clarence A. O'Brien
Attorney

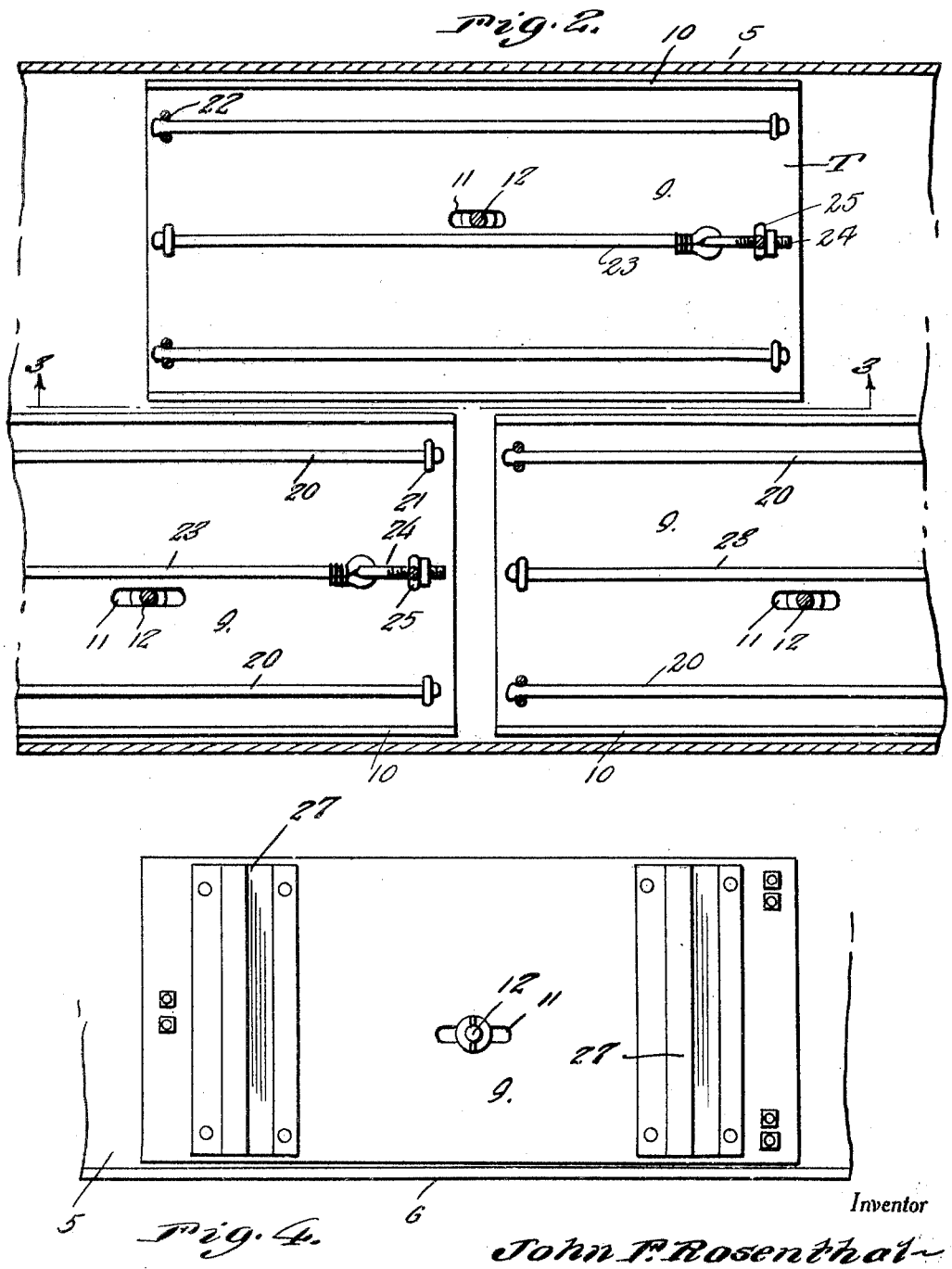

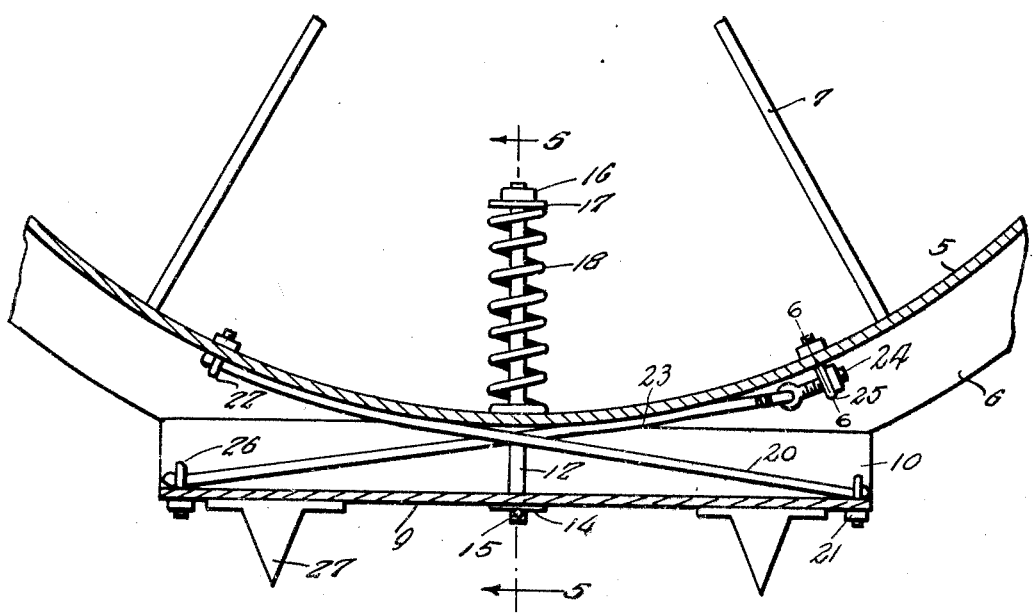
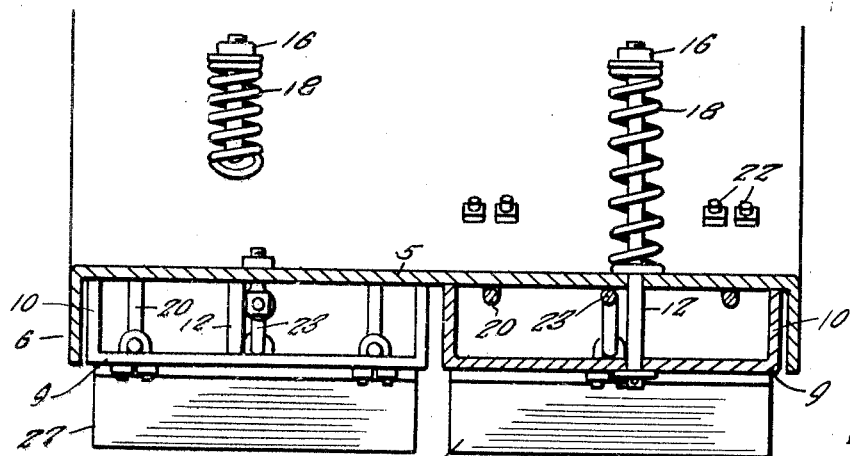

Patented Feb. 9, 1932

1,844,440

UNITED STATES PATENT OFFICE

JOHN F. ROSENTHAL, OF PLOVER, WISCONSIN

TRACTOR WHEEL

Application filed June 17, 1931. Serial No. 545,111.

The present invention relates to a tractor wheel and has for its prime object to provide means for attaching traction members to the outer peripheral portion of a rim or tractor wheel independently of the central hub portion in a manner which will permit them to move or oscillate circumferentially as the wheel traverses the ground, thus providing a continuous smooth track over which the rim of the wheel may roll so as to move expeditiously over rough ground, in mud, over snow, and in other like or similar conditions in which it is difficult for a tractor wheel to operate efficiently.

A still further very important object of the invention resides in the provision of a tractor wheel of this nature which is exceedingly simple in its construction, strong and durable, thoroughly reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 2 is an enlarged detail sectional view taken substantially on the line 2—2 of Figure 1 some of the U-bolts being shown in section.

Figure 3 is a detail sectional view taken substantially on the line 3—3 of Figure 2.

Figure 4 is an outer plan view of one of the traction members.

Figure 5 is a sectional view taken substantially on the line 5—5 of Figure 3.

Figure 1:
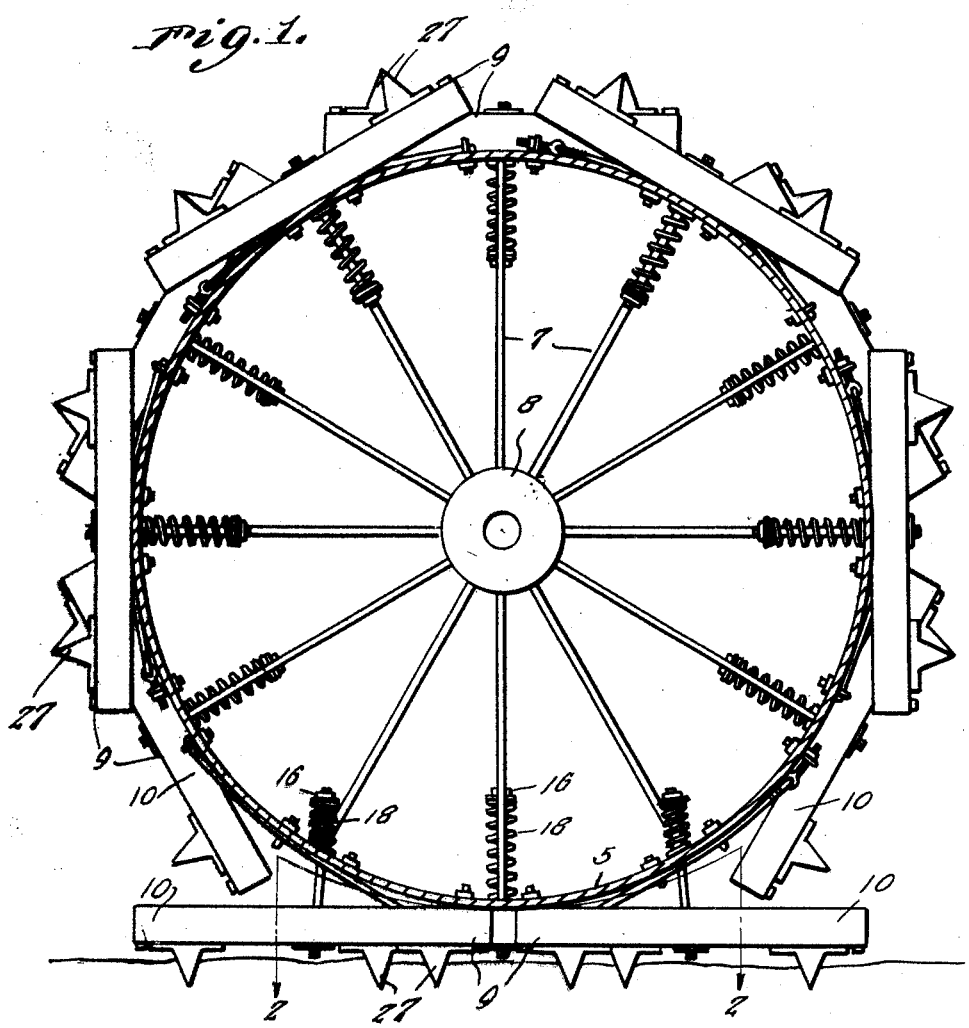
Figure 1 is a side elevation of a tractor wheel embodying the features of my invention.
Figure 6:
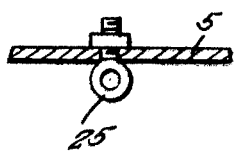
Figure 6 is a detail section taken substantially on the line 6—6 of Figure 3.

Referring to the drawings in detail it will be seen that the numeral 5 denotes an annular rim having at its edges outwardly directed annular flanges 6. The rim 5 is mounted on the outer end of spokes 7 radiating from a hub 8.

Two annular series of traction members T are arranged about the rim, one series being alternately arranged with respect to the other. A detailed description of one of the tractor members T and mounting therefor will suffice for all.

Each tractor member T comprises a rectangular flat plate or body 9 with inwardly directed side flanges 10. At the center of the plate 9 there is a slot 11 longitudinally disposed. A bolt 12 extends through the slot 11 and through an opening in the rim 5. On the outer end portion of the bolt 12 is a washer 14 held in place by a cotter pin or the like 15. A nut 16 and a washer 17 are mounted on the inner end of the bolt. A coil spring 18 is disposed about the bolt 12 to impinge against the washer 17 and the rim 5 thereby holding the edges of the inwardly directed flanges 10 into engagement with the outer surface of the rim and permitting the traction members to rock on the rim.

A pair of flexible members such as cables, wires or the like 20 have ends anchored in U bolts 21 at one end of the plate 9 and similar U bolts 22 mounted in the rim 5 and a cable 23 is disposed between the members 20 having one end engaged with an eye bolt 24 adjustably engaged with an eye bolt 25 in the rim and the other end of the flexible member 23 is engaged in a U bolt 26 at the other end of the plate 9. Transversely disposed cleats 27 are mounted on the outer surfaces of the plate 9.

It will be readily apparent that as the wheel rolls, the same will roll on the flanges 10 of the plates 9 which will be disposed flat on the ground in a progressive manner during the movement of the wheel so that the wheel may roll efficiently in soft ground and under other well known conditions.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination, a tractor wheel having a channel-shaped rim, a channel-shaped tractor member having its flanges contacting the rim between the flanges of said rim, said tractor member having a longitudinally extending slot therein, a rod passing through the slot in the member and through a hole in the rim, a projection on the outer end of the rod for holding it in the slot, a washer on the inner end of the rod, a spring encircling the rod and located between the washer and the rim, a pair of cables having their one ends connected to one end of the inner face of the tractor member and having their other ends connected to the rim adjacent the opposite end of the tractor member, a cable having one end connected to the said opposite end of the inner face of the tractor member and having its other end connected to the rim at a point adjacent the first mentioned end of the tractor member, an eye bolt carried by the rim and a bolt connected to the last-mentioned end of the last-mentioned cable and passing through the eye bolt to adjustably connect the said cable to the rim.

In testimony whereof I affix my signature.

JOHN F. ROSENTHAL.